US006703123B1

(12) United States Patent
Shibuta et al.

(10) Patent No.: US 6,703,123 B1
(45) Date of Patent: Mar. 9, 2004

(54) CONDUCTIVE FIBER, MANUFACTURING METHOD THEREFOR, APPARATUS, AND APPLICATION

(75) Inventors: Daisuke Shibuta, Oomiya (JP); Hiroyuki Imai, Oomiya (JP); Masahiro Yokomizo, Oomiya (JP); Makoto Tsunashima, Tokyo (JP); Yusuke Maeda, Akita (JP); Nobuo Furuya, Akita (JP)

(73) Assignees: Mitsubishi Materials Corporation, Tokyo (JP); Japan Electric Metals Corporation, Ltd. Akita Plant, Akita (JP)

( * ) Notice: Subject to any disclaimer, the term of this patent is extended or adjusted under 35 U.S.C. 154(b) by 1 day.

(21) Appl. No.: 09/708,615

(22) Filed: Nov. 9, 2000

(30) Foreign Application Priority Data

Feb. 18, 2000 (JP) ....................................... 2000-040879
Apr. 24, 2000 (JP) ....................................... 2000-122587

(51) Int. Cl.[7] .......................... D02G 3/00; B32B 15/00; B32B 9/00; B32B 3/00; B32B 27/34; B32B 27/36

(52) U.S. Cl. ....................... 428/375; 428/389; 428/395; 428/378; 428/379; 428/381; 428/394

(58) Field of Search ................................ 428/389, 395, 428/375, 378, 379, 381, 394

(56) References Cited

U.S. PATENT DOCUMENTS

| | | | | | |
|---|---|---|---|---|---|
| 3,792,520 A | * | 2/1974 | Weiner | 29/191.6 |
| 3,864,148 A | | 2/1975 | Maeawa et al. | 117/47 |
| 3,877,965 A | * | 4/1975 | Broadbent et al. | 427/304 |
| 4,042,737 A | * | 8/1977 | Forsgren et al. | 428/96 |
| 4,247,596 A | | 1/1981 | Yee | 428/380 |
| 4,267,233 A | * | 5/1981 | Tanaka et al. | 428/389 |
| 4,457,973 A | * | 7/1984 | Matsui et al. | 428/372 |
| 4,752,415 A | * | 6/1988 | Iwaskow et al. | 252/511 |
| H526 H | | 9/1988 | Miller | 361/424 |
| 5,173,366 A | * | 12/1992 | Mitamura et al. | 428/373 |
| 5,218,171 A | * | 6/1993 | Aldissi | 174/128.1 |
| 5,250,228 A | * | 10/1993 | Baigrie et al. | 252/511 |
| 5,461,889 A | | 10/1995 | Adams et al. | 68/189 |
| 5,547,610 A | * | 8/1996 | Mortensen | 252/514 |

FOREIGN PATENT DOCUMENTS

| | | | |
|---|---|---|---|
| EP | 0 185 480 | | 5/1986 |
| EP | 0544402 A2 | * | 6/1993 |
| JP | 60-173164 | | 9/1985 |
| JP | 11050351 | * | 2/1999 |
| JP | 11200149 | * | 7/1999 |

OTHER PUBLICATIONS

Chambers dictionary of science and technology, vol. 1, A–K, p. 211.

Textile Dyeing Operations (Kulkarni S.V. et al.), 1986, Noyes Publications, Park Ridge, USA, pp 241–243.

* cited by examiner

*Primary Examiner*—Cynthia H. Kelly
*Assistant Examiner*—Camie Thompson
(74) *Attorney, Agent, or Firm*—Oblon, Spivak, McClelland, Maier & Neustadt, P.C.

(57) ABSTRACT

A white conductive fiber is manufactured at an inexpensive cost having superior conductivity and high degree of whiteness, in which a metal coating plated on the fiber has superior adhesiveness. A method for manufacturing the white conductive fiber comprises the steps of mounting a wound fiber body formed by winding a continuous fiber to the fixing shaft, a step of flowing a plating solution from the fixing shaft to a plating bath via the wound fiber body so as to infiltrate the plating solution into the wound fiber body, and a step of performing electroless plating of silver, platinum, or the like on the fiber material while the plating solution flows.

18 Claims, 4 Drawing Sheets

CONDUCTIVE FIBER, MANUFACTURING METHOD THEREFOR, APPARATUS, AND APPLICATION

BACKGROUND OF THE INVENTION

1. Field of the Invention

The present invention relates to a metal-coated white conductive fiber having a high degree of whiteness and superior conductivity, in which a metal coating provided on the fiber has superior adhesiveness. In particular, the present invention relates to a conductive fiber having a high degree of whiteness, comprising a metal coating having superior adhesion strength and conductivity provided on a fiber material composed of a polymer, such as a polyamide fiber or a polyester fiber. The conductive fibers of the present invention can be used as material for various cloths and clothing, and in addition, can be used in industrial materials, such as electromagnetic shielding materials, antistatic materials, and alternative materials for electrodes and electric cables.

2. Description of the Related Art

Conductive fibers are conventionally known in which metal thin-films are coated on the surfaces of fibers composed of polymer materials, such as polyamide fibers and polyester fibers, and in order to improve the adhesion of metal coatings thereto, various methods have been attempted. For example, in the case in which copper sulfide is coated, a method is disclosed in Japanese Examined Patent Application Publication No. 1-37513 in which a polymer material is pretreated with a dye having groups for binding copper ions so as to form bonds with copper ions and is then sulfurized, and a method is disclosed in Japanese Unexamined Patent Application Publication No. 6-298973 in which groups for binding copper ions are adhered to a fiber surface roughened by an alkaline treatment, and copper sulfide is then bonded thereto. In addition, in the case of materials which are difficult to plate with metal, such as aramid fibers, a method is disclosed in, for example, Japanese Translation of PCT International Publication for Patent Application No. 6-506267, in which metal ions are adhered to the fiber surface by using polyvinylpyrrolidone (PVP) and are then reduced so as to perform metal plating.

However, the plating method using PVP cannot be commonly used since it can only be applied to limited types of fibers. In addition, in the coating methods using the groups for binding copper ions, there are problems in that the metal coating obtained is only composed of copper or compounds thereof, and the adhesion strength of the metal coatings is not always sufficient. In this connection, adhesion strengths of metal coatings can be generally enhanced when fiber materials are roughened by alkaline treatment; however, when the degree of roughening of the surface and the conditions of the metal coating are not properly controlled, satisfactory effects cannot be obtained.

In addition, as a conventional method for manufacturing white conductive fiber, there are methods, for example, a method (a) for melt spinning a starting material for fiber compounded with a white conductive component, a method (b) for coating a white component on the surface of a fiber material containing a carbon component, which are disclosed in Japanese Unexamined Patent Application Publication Nos. 4-2808, 2-169715, 4-361613, and 60-126321, and a method (c) for coating a metal on fiber material by various methods, which are disclosed in Japanese Unexamined Patent Application Publication Nos. 7-179769 and 4-263667. However, the methods described above have the following problems as described below. That is, in the methods (a) and (b), the conductive fiber manufactured thereby has a volume resistivity of $10^5$ to $10^6$ Ω·cm or more, which is not sufficient conductivity for use in electromagnetic shielding, and hence, the conductive fiber thus formed can be applied only to antistatic applications and the like. In addition, in the method (c), pretreatment is performed using a dye prior to the metal coating in order to enhance the adhesion between the fiber and the metal to be coated, and due to the dye mentioned above, the original whiteness of the fiber material is degraded so that the coating has a slightly blue, green, gray, or black tone, whereby there are problems when they are used for textiles and for clothing.

In addition, a silver coated fiber used for conductive fillers and electromagnetic shielding materials is known which is formed by silver plating on an organic fiber; however, the longer fibers produced thereby are approximately 20 cm, and hence, the silver coated fiber cannot be commonly used since it is not a continuous fiber. In the case in which metal plating is performed on a continuous fiber in a state in which the fiber is wound around a shaft in the melt spinning step, when the continuous fiber in a wound state (wound fiber body) is metal plated by dipping in a plating solution, the plating solution may not sufficiently infiltrate inside the wound fiber body around which the continuous fiber is repeatedly wound, and almost all of the fibers are defective products having mottled plating, whereby it is difficult to obtain a continuous fiber in which the entire surface thereof is uniformly plated with metal.

SUMMARY OF THE INVENTION

The present invention solves the problems in the conventional white conductive fiber described above, and accordingly, an object of the present invention is to provide a white conductive fiber having a high degree of whiteness, and superior conductivity, and is to provide a manufacturing method therefor. The white conductive fiber described above has a metal coating uniformly coated on the entire surface thereof even though the fiber is a continuous fiber in a wound form. In addition, another object of the present invention is to provide a metal-coated conductive fiber having a metal coating thereon, in which the metal coating has superior adhesion strength and superior coating strength in addition to high conductivity. Furthermore, the present invention provides a method for manufacturing the conductive film described above and an apparatus therefor.

Conductive Fiber

The present invention relates to a conductive fiber composed of a fiber material provided with a metal coating thereon having a degree of whiteness (L value in accordance with the Lab method) of 50 or more and a volume resistivity of 100 Ω·cm or less. In addition, the present invention relates to a conductive fiber composed of a fiber provided with a metal coating thereon, in which the surface of the metal coating has an orange peel texture.

The conductive fiber according to the present invention preferably has a degree of whiteness (L value) of 50 or more and a volume resistivity of 100 Ω·cm or less and has a metal coating thereon having an orange peel texture. As a fiber material, a polyester fiber, a polyamide fiber, or an acrylic fiber can be used. As a metal coating, silver, gold, platinum, copper, nickel, tin, zinc, palladium, or an alloy thereof may be used. The conductive fiber of the present invention more preferably has a degree of whiteness (L value) of 55 or more, a volume resistivity of 0.1 Ω·cm or less, and a metal coating provided with an orange peel surface having a surface roughness of 0.01 to 1 μm.

Since the conductive fiber according to the present invention can be obtained in a continuous fiber form, the fiber is easily used for woven fabrics and the like and can be widely used for clothing materials and various fabric materials. In addition, since the fiber has superior conductivity, by weaving a small amount thereof with a base material, superior conductivity can be obtained without impairing the hue and the feeling of the base material. The conductive fiber can also be used for various conductive materials such as an electromagnetic shielding material. In addition, since the conductive fiber has beautiful whiteness, when spun with cloths or base materials provided with a hue having a high degree of whiteness, a product can be obtained without impairing the original colors thereof. Furthermore, since the conductive fiber can be formed of a commonly used continuous fiber, such as a polyamide fiber, a polyester fiber, and an acrylic fiber, the conductive fiber can be used for broader applications.

Since the metal coating provided on the conductive fiber according to the present invention has an orange peel surface, the metal coating has superior adhesion, and more particularly, has a standard strength of grade 3 or more. In addition, when a metal coating is formed of silver having silver ions with antifungal properties, the conductive fiber having the metal coating thereon can be used as an antifungal material. Furthermore, when surface treatment is further performed on the metal coating provided on the fiber, such as anticorrosion treatment and oiling treatment, degradation of the whiteness and decrease in the adhesion can be avoided, and the slipping properties of the fiber can be improved by oiling treatment.

The conductive fiber according to the present invention can be preferably used for a woven fabric, a non-woven fabric, a knitted fabric, a clothing material having antifungal properties, an electromagnetic shielding material, an antistatic material, an alternative material for an electrode and an electric cable, and a conductive reinforcing material for a fiber-reinforced plastic.

Method for Manufacturing Conductive Fiber

The present invention relates to a method for manufacturing a conductive fiber comprising the steps of providing a tubular fixing shaft having a plurality of holes for passing a solution in a plating bath, mounting a wound fiber body formed by winding a fiber material around a core to the fixing shaft, forming a flow path of a plating solution from the fixing shaft to the plating bath via the wound fiber material so as to infiltrate the plating solution into the wound fiber body, and performing electroless plating on the fiber material while the plating solution flows. The method for manufacturing a conductive fiber described above preferably further comprises a step of temporarily forming a flow path of the plating solution from the plating bath to the fixing shaft via the wound fiber body so as to infiltrate the plating solution into the wound fiber body.

As described above, the manufacturing method described above comprises the step of forming the flow path of the plating solution from the fixing shaft to the plating bath via the wound fiber body so as to infiltrate the plating solution into the wound fiber body. When the flow path is formed from the fixing shaft to the plating bath via the wound fiber body, the wound fiber body is expanded toward the outside, and the plating solution infiltrates into the gaps in the wound fiber body formed by winding a continuous fiber, whereby plating can be performed uniformly on the entire surface of the fiber.

In addition to the step of forming a flow path from the fixing shaft to the plating bath via the wound fiber body, the method for manufacturing a conductive fiber of the present invention may further comprise the step of temporarily forming a flow path from the plating bath to the fixing shaft via the wound fiber material so as to infiltrate the plating solution into the wound fiber body. When the flow path is temporarily formed from the plating bath to the fixing shaft via the wound fiber body so as to infiltrate the plating solution received in the plating bath into the wound fiber body by stopping the flow path from the fixing shaft to the plating bath via the wound fiber body, plating can be performed more uniformly.

The manufacturing method described above preferably further comprises, after the step of mounting the wound fiber material, a step of washing treatment, a step of alkaline treatment, a step of neutralization treatment, and a step of activation treatment, in which the subsequent step of performing electroless plating is one of a step of performing silver electroless plating and a step of platinum electroless plating. Accordingly, metal plating is performed uniformly on the entire surface of the continuous fiber even though in a wound body, whereby a white conductive fiber can be manufactured having a degree of whiteness (L value) of 50 or more, and more preferably, of 55 or more, and a volume resistivity of 100 Ω·cm or less, and more preferably, of 0.1 Ω·cm or less.

Manufacturing Apparatus

The present invention relates to an apparatus for manufacturing a conductive fiber comprising a plating bath, a detachable fixing shaft mounted in the plating bath, a storage tank for storing a plating solution, a first solution supply tube communicating between the plating bath and the storage tank, and a solution supply pump provided to the first solution supply tube. In the apparatus according to the present-invention, the fixing tube is formed of a hollow cylinder and is provided with a plurality of holes for passing solution in the wall thereof, the first solution supply tube is connected to the fixing tube, and the plating solution is supplied to the plating bath via the fixing shaft. The apparatus preferably further comprises a second solution supply tube for discharging the plating solution from the plating bath to the storage tank, wherein the first solution supply tube and the second solution supply tube form a circulating path for circulating the plating solution. According to the manufacturing apparatus described above, the manufacturing method described above can be easily carried out.

According to the present invention, a white conductive fiber, which is a continuous fiber wound around a core, can be obtained having high conductivity preferably used for electromagnetic shielding. The white conductive fiber has a volume resistivity of 100 Ω·cm or less, and more preferably, of 0.1 Ω·cm or less, and has a degree of whiteness of 50 or more, and preferably, of 55 or more. Since the conductive fiber according to the present invention has beautiful whiteness, when spun with cloths or base materials provided with a hue having a high degree of whiteness, a product can be obtained without impairing the original colors thereof. Since the fiber has superior conductivity, by weaving a small amount thereof with a base material, superior conductivity can also be obtained without impairing the hue and the feeling of the base material. In addition, since pretreatment and plating can be performed for a fiber in a cheese winding form, a conductive fiber having high performances can be obtained at an inexpensive cost. Furthermore, since the conductive fiber can be formed of a commonly used continuous fiber, such as a polyamide fiber, a polyester fiber, and an acrylic fiber, the conductive fiber can be used for broader applications. Since the metal-coated fiber of the present invention comprises a metal coating provided thereon having high adhesion, the durability thereof is significant, and the superior conductivity can be maintained over long periods of time, whereby the metal-coated fiber is preferably used for various conductive materials. In addition, since the metal coating formed by silver plating has superior antifungal properties due to the silver ions in the metal coating, the conductive fiber of the present invention may be used as antifungal materials.

DESCRIPTION OF THE PREFERRED EMBODIMENTS

Figure 1:
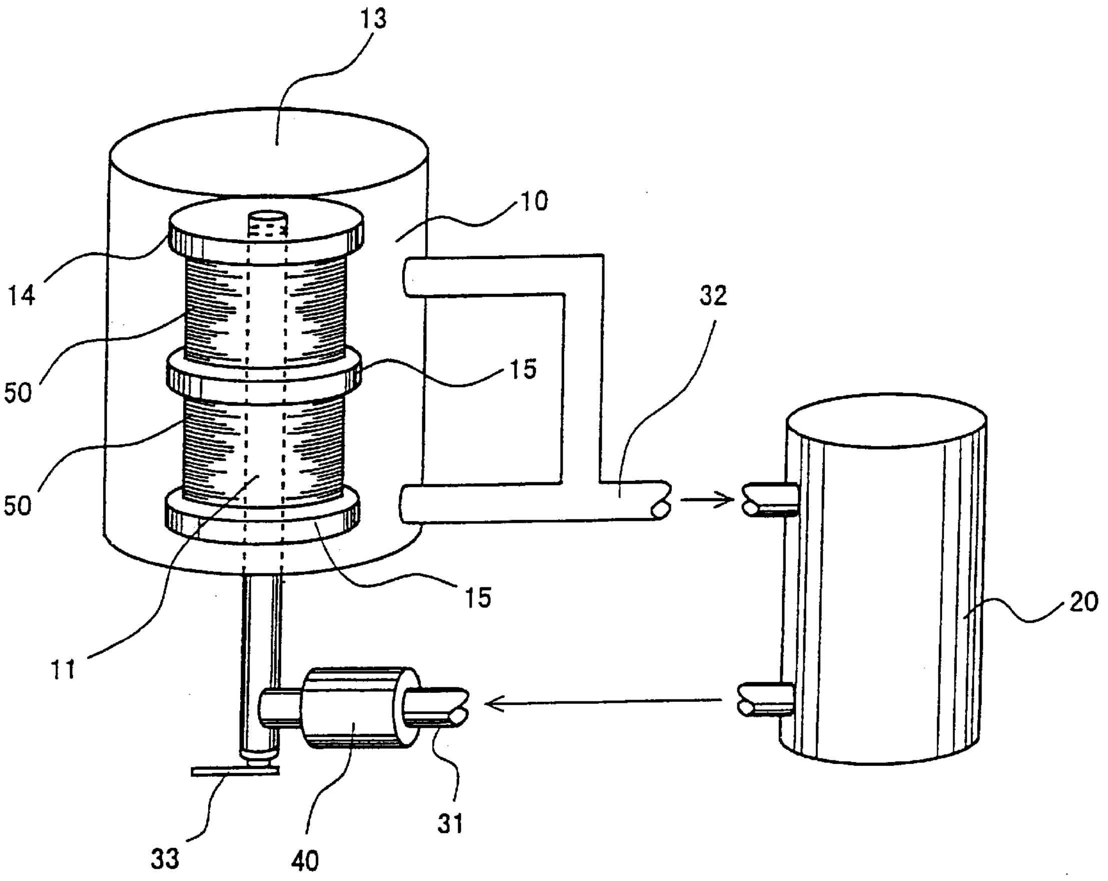
FIG. 1 is a schematic view showing a manufacturing apparatus according to the present invention.

Hereinafter, the present invention will be described in detail with reference to embodiments.

(I) White Conductive Fiber

The conductive fiber according to the present invention is a white conductive fiber having a high degree of whiteness and a high conductivity manufactured by plating a metal on a continuous fiber wound around a core, in which the degree of whiteness (L value by the Lab method) is 50 or more, and preferably, 55 or more, and the volume resistivity is 100 Ω·cm or less, and preferably, 0.1 Ω·cm or less.

As a fiber material, a continuous fiber composed of a polyester, a polyamide, an acrylonitrile polymer, and the like can be used. Conventionally, it is difficult to form a metal coating uniformly on a continuous fiber mentioned above in a cheese winding form (a state in which a continuous fiber is wound around a core so as to have an approximately consistent diameter from the top to the bottom of the core), and hence, a conductive continuous fiber is not obtained having a high degree of whiteness and high conductivity, which are equivalent to those of the conductive fiber according to the present invention. A conventional conductive fiber having a degree of whiteness of approximately 55 is known; however, the fiber cannot be used for electromagnetic shielding in practice since the conductivity thereof is low. On the other hand, a fiber, which can be used for electromagnetic shielding, has a degree of whiteness of approximately 40, and in addition, has various color tones, whereby the application thereof is limited.

The conductive fiber according to the present invention is a white conductive fiber composed of a continuous fiber manufactured by plating a metal uniformly on the entire surface of a continuous fiber even in a wound form around a core, in which silver plating is preferably performed uniformly on the surface of the fiber so that the thickness thereof is 0.2 to 1.0 μm. According to the plating described above, a metal-coated white conductive fiber composed of a continuous fiber can be obtained having beautiful whiteness of a degree of 50 or more, and preferably, of 55 or more, and having a high conductivity of 100 Ω·cm or less, and preferably, of 0.1 Ω·cm or less.

In addition, the metal-coated conductive fiber coated with a metal coating is characterized in that the metal coating has an orange peel surface. In the present invention, the orange peel surface is a roughened surface like an orange peel surface, and is sometimes referred to as a pear peel surface or the like. The surface of the metal coating exhibiting an orange peel surface is one in which the surface thereof is in a roughened state similar to that of an orange peel. When the surface of the metal coating has a texture similar to that of an orange peel surface and is preferably formed of metal grains having an appropriate grain distribution as described later, the metal coating has a high adhesion strength and thereby has superior durability.

The orange peel surface described above is formed of fine metal grains on the surface of the metal coating. The orange peel surface of the metal coating according to the present invention is preferably formed of metal grains having diameters of 0.01 to 1 μm, i.e., a surface roughness of 0.01 to 1 μm, and more preferably, of 0.05 to 0.5 μm. When the surface roughness of the metal coating is less than 0.01 μm, the surface of the film has a smoother appearance, and the metal coating is thicker, whereby the metal coating is easily separated. On the other hand, when the surface roughness exceeds 1 μm, it is not preferable since metal grains are easily separated.

When a metal coating coated on a fiber material has an orange peel texture having a surface roughness of 0.01 to 1 μm, the metal coating has a high adhesion strength., In particular, even though to some extent depending on the method for plating a metal, the metal coating generally has a separation strength corresponding to a grade 3 or above of the staining criteria in the separation strength test in accordance with the standards (JIS L 0849). The standard test described above (JIS L 0849) is a test for determining color fastness of fibers and cloths, in which adhesion of a color dyed on a cloth is determined by the degree of staining generated on a white cloth which is overlaid over a cloth colored with a dye and is rubbed therewith a predetermined number of times under a predetermined load. The standards from grade 1 to grade 5 are defined in decreasing order of staining (in the increasing order of adhesion), and grade 5 is the lowest degree of staining, i.e., grade 5 is the highest degree of adhesion. The metal coating of the present invention has an adhesion strength corresponding to grade 3 or above, and in general, has a high adhesion strength corresponding to grade 4 to grade 5.

The metal coating having an orange peel surface can be formed by controlling plating conditions, and more particularly, by controlling the rate of plating. In metal plating, immediately after plating is initiated, metal grains are formed at an underlying layer (surface of a fiber) and then grow so as to form a coating film. In this step, when the plating temperature is too high, or when the amount of catalyst is too large, a large number of super fine metal grain nuclei is formed simultaneously since the rate of plating is high (as a result, the surface thereof appears to be smooth), and hence, a dense metal coating having superior adhesion cannot be obtained. On the other hand, when plating is performed at an appropriate rate of plating, a metal coating is gradually formed with metal grains as nuclei while maintaining the shapes thereof, which are formed at an underlying layer immediately after plating is initiated, whereby a dense metal coating having superior adhesion can be obtained. As described above, since the orange peel texture of the metal coating varies depending on operating conditions and is not determined only by the thickness of the coating film, it is important that the metal coating have an orange peel surface regardless of the thickness thereof. In general, when the thickness of a metal coating is increased, the film tends to be easily separated regardless of the surface conditions thereof. However, the metal coating having an orange peel surface is difficult to separate due to high adhesion strength thereof compared to a film having an equivalent thickness to the film mentioned above but having no orange peel surface.

As a fiber material used for the metal coated fiber according to the present invention, there may be mentioned a fiber primarily composed of a polymer material, such as a polyester, a polyamide, an acrylic polymer, or a polyolefin, a cellulose-based fiber, such as cotton or a rayon, an inorganic fiber, such as a glass fiber, and a composite fiber formed of fibers mentioned above including the inorganic fiber. Among these mentioned above, a polyester fiber, an acrylic fiber, and a polyamide fiber are advantageously used. In particular, even though a continuous polyester fiber is conventionally difficult to plate with a metal, a metal-coated fiber thereof having a high adhesion strength can be obtained according to the present invention. The widths of monofilaments of these fibers are preferably 0.1 to 15 d (denier). When the width thereof is less than 0.1 d, it is not preferably since the strength is not sufficient. When the width is more than 15 d, it is not preferably since the fiber is hardened when coated with a metal, and hence, the flexibility thereof is decreased.

A metal coated on the surface of a fiber is not specifically limited. In particular, there may be mentioned, for example, silver, gold, platinum, copper, nickel, tin, zinc, palladium, and alloys thereof. Among these mentioned above, in order to obtain a white conductive fiber, a metal is used having white brilliance and high conductivity, such as silver, platinum, tin, nickel, or an alloy thereof. These metals mentioned above can be coated on a surface of a fiber by electrolytic plating, chemical plating, or vacuum evaporation. In addition, conditions and methods therefor are not specifically limited so long as a metal coating having an orange peel surface can be formed.

According to the present invention, by coating a metal coating having an orange peel surface on a fiber material, and more preferably, by coating a metal coating having an orange peel surface having the surface roughness described above on a fiber material, a conductive fiber having a superior adhesion strength can be obtained. In particular, a conductive fiber can be obtained composed of monofilaments having a resistivity (volume resistivity) of 0.01 Ω·cm or less, preferably of 0.001 Ω·cm or less, and more preferably, of approximately $10^{-4}$ to $10^{-5}$ Ω·cm. In addition, in particular, when a metal is coated having white brilliance, such as silver, platinum, nickel, and tin, a conductive fiber can be obtained having a high degree of whiteness (L value) of 50 or more. For the measurement of the degree of whiteness, the Lab method in accordance with Hunter's formula is used.

Conventionally, even though various white conductive fibers are known, a fiber formed by compounding a white conductive component with a fiber material has a high resistivity (volume resistivity) of $10^4$ to $10^6$ Ω·cm or more and cannot be used as an electromagnetic shielding material and the like due to the low conductivity thereof. In addition, a fiber having a conductivity of approximately 0.01 Ω·cm is known formed by coating a metal coating after a fiber is pretreated with a dye; however, the fiber mentioned above slightly has a blue or a green tone, whereby a conductive fiber having a high degree of whiteness cannot be obtained. In contrast, since the metal-coated fiber according to the present invention has higher adhesion by coating a metal coating having an orange peel surface, no coloration due to a dye material occurs, and hence, a conductive fiber can be obtained having a high degree of whiteness and superior conductivity due to the high separation strength (adhesion strength) of the metal coating.

In addition, since the metal-coated fiber according to the present invention uses silver as a metal coating, the metal-coated film has superior antifungal properties due to the silver ions in addition to the whiteness and conductivity. The metal-coated fiber of the present invention constantly effuses a small amount of silver ions (for example, 1 ppb to 1 ppm) over long periods of time, and as a result, antifungal properties can last longer.

The metal-coated fiber according to the present invention may be a fiber in which the metal coating is processed by surface treatment. As surface treatment, an anticorrosion treatment or an oil treatment (oiling) may be performed. By performing an anticorrosion treatment, degradation of degree of whiteness with time and degradation of adhesion (separation strength) can be avoided. In addition, by performing an oil treatment, slipping properties of a surface of a fiber can be improved. Furthermore, the oil treatment improves slipping properties of fibers when fabricated by looms or knitting machines, so that the adhesion of a metal coating can be protected.

Figure 2:
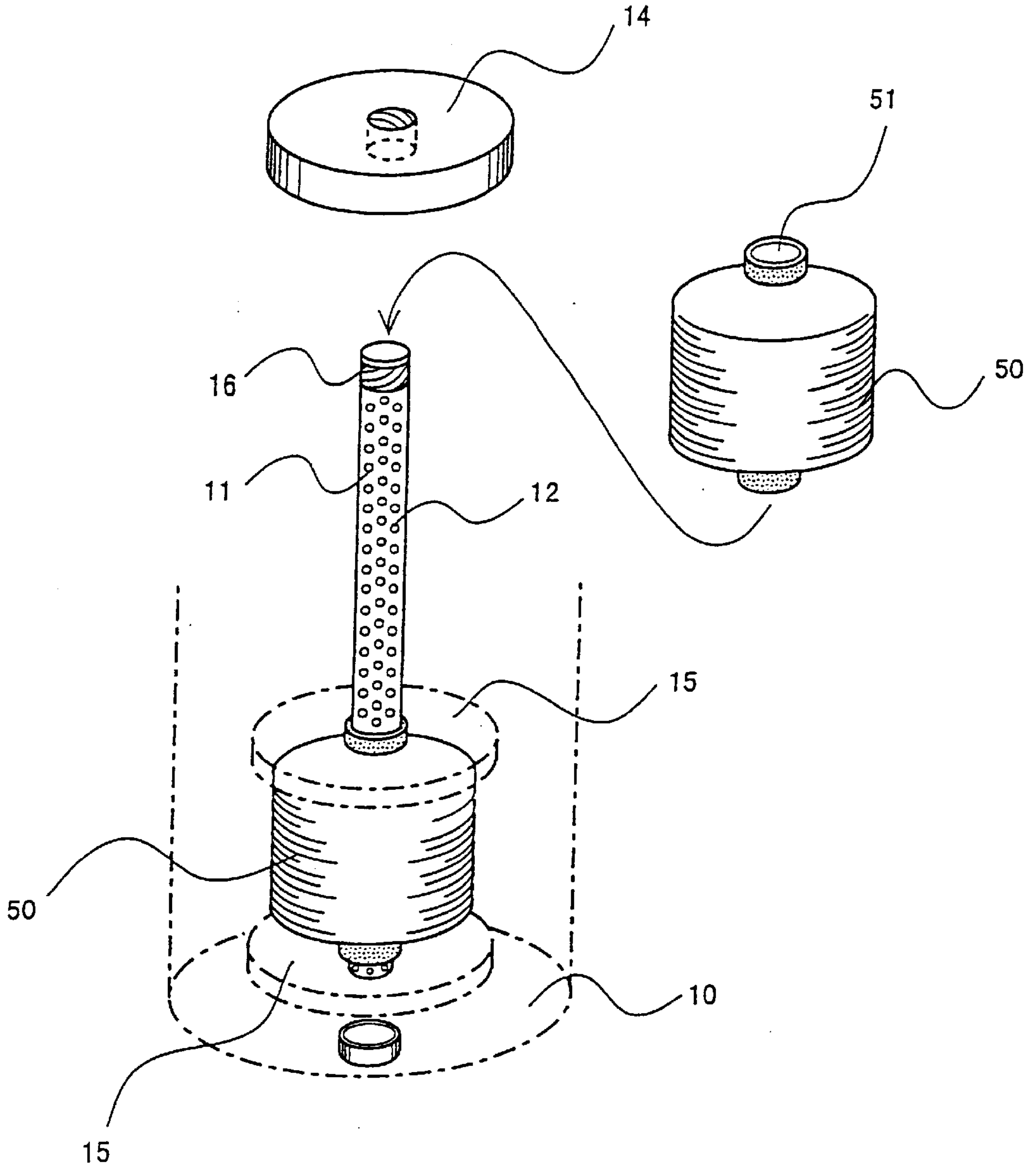
FIG. 2 is a schematic view showing a wound fiber body mounted in a manufacturing apparatus according to the present invention.
Figure 3:
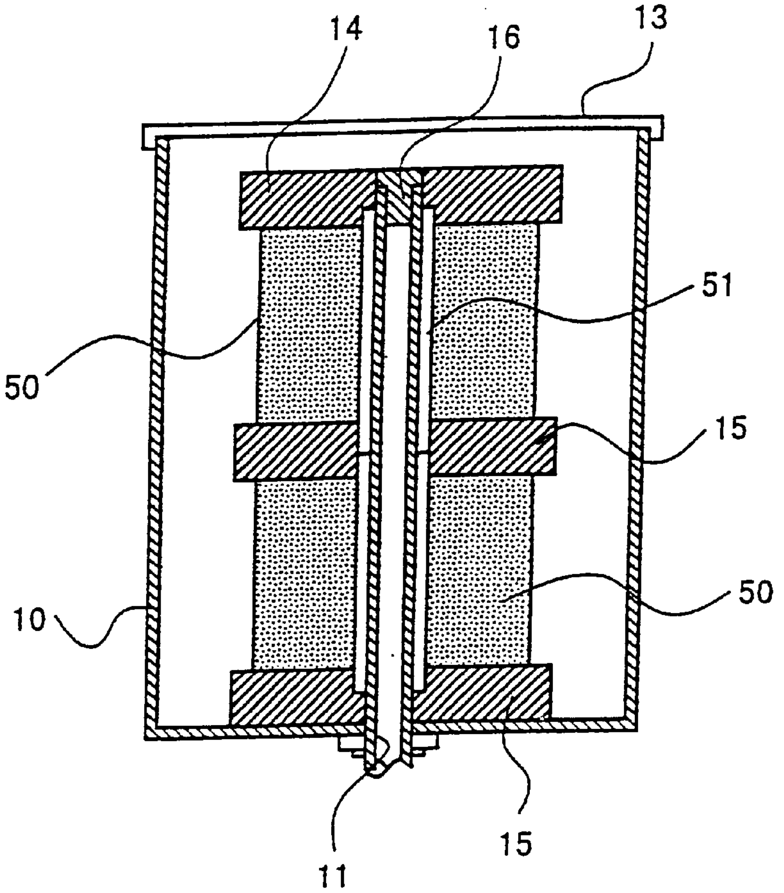
FIG. 3 is a schematic cross-sectional view showing the inside of a plating bath according to the present invention.

The surface treatment described above can be performed by circulating a treatment solution under pressure using a plating apparatus shown in FIG. 2, as is the case with pretreatment for fibers, such as degreasing treatment or activation treatment. As an anticorrosion agent, there may be mentioned a water-soluble anti-discoloration agent for silver (trade name: Cheleslite ACW-1 manufactured by Chelest Chemical Inc.), an anti-discoloration agent for gold and silver (trade name: Precoat Ag manufactured by Nippon Pure Chemical Co., Ltd.), an anti-discoloration agent for silver (trade name: EL manufactured by Nisshin Chemical Industry Co., Ltd.), and the like. As an oil treatment agent, a mixture of DELION 480 (manufactured by Takemoto Oil & Fats Co., Ltd) and-SMA-2 and the like are recommended.

The metal-coated fiber according to the present invention can be used for cloths and knitting materials, such as woven fabrics and non-woven fabrics. In the case described above, since a fiber using silver, tin, nickel, or the like has a high degree of whiteness, and hence, has superior coloring properties when it is dyed, the fiber is preferably used for textile fabrics and for clothing materials. In addition, a fiber coated with silver or the like can be used for an antifungal fiber and antifungal clothing. As particular applications thereof, there may be mentioned antifungal socks, underwear, jackets, white garments, bedclothes, sheets, napkins, gloves, shirts, pants, working clothes, and the like. In addition to clothing materials, the metal-coated fiber of the present invention can be used by exploiting the conductivity thereof for electromagnetic shielding materials, antistatic materials used for clean suits, clean gloves, clean shoes, and the like, and alternative materials for electrodes and electric cables for weight-reduction thereof. Furthermore, the metal-coated fiber of the present invention can be used as a conductive reinforcing material for a fiber-reinforced plastic.

(II) Manufacturing Method and Manufacturing Apparatus

FIG. 1 shows an example of a structure of an apparatus for manufacturing the conductive fiber of the present invention. As shown in FIG. 1, the plating apparatus of the present invention has a plating bath 10, a storage tank 20 for storing a plating solution, solution supply tubes 31 and 32 communicating between the plating bath 10 and the storage tank 20, and a solution supply pump 40 provided at the solution supply tube 31. The plating bath 10 is closed by a lid 13 provided at the top thereof. In the plating bath 10, a fixing shaft 11 is provided so as to mount a wound fiber body 50 which is a fiber material in a cheese winding form. The fixing shaft 11 is formed of a hollow cylinder and is provided with a plurality of holes 12 for passing a solution in the wall thereof. In the example of the apparatus shown in the figure, the fixing shaft 11 is vertically provided at the bottom of the plating bath 10, and the top of the fixing shaft 11 is closed by a plug 16. In addition, the fixing shaft 11 is detachably mounted at the bottom of the plating bath 10 so as to easily mount the wound fiber body 50 and so as to be able to mount a wound fiber body wound around a core 51 having a diameter differing from others. The solution supply tube 31 is connected with the fixing shaft 11 so as to communicate therewith. A plating solution in the storage tank 20 is fed to the fixing shaft 11 by the solution supply pump 40 via the solution supply tube 31 and is then fed in the plating bath 10 from the plurality of passing holes 12 provided in the wall of the fixing shaft 11. In addition, the solution supply tubes 32 for discharging a solution to the storage tank 20 are provided at the upper and the lower parts of the plating bath 10, and a circulation path for circulating the plating solution is formed by these solution supply tubes 31 and 32. The solution supply tube's 31 and 32 are provided with open-close valves at appropriate positions thereof.

As shown in FIG. 2, a fiber material is wound in a cheese winding form around the hollow core 51, which passes a solution, so as to form the wound fiber body 50, and the wound fiber body 50 is mounted to the fixing shaft 11 so that the fixing shaft 50 penetrates the core 51. When necessary, a plurality of the wound fiber bodies 50 can be mounted to the fixing shaft 11 in the vertical direction. In the example shown in the figure, two wound fiber bodies 50 are mounted in the vertical direction. A fixing plate 14 is provided at the top of the fixing shaft 11 which is mounted with the wound fiber body 50. The fixing plate 14 has a threaded opening 17 at the center thereof and is mounted to the top of the fixing shaft 11 by screwing the threaded opening 17 thereon. The fixing plate 14 is in close contact with the wound fiber body 50 and, when the top of the fixing shaft 11 is screwed therein, compresses the wound fiber body 50 in the vertical direction so as not to form gaps between the fixing plate 14 and the wound fiber body 50 and between the wound fiber bodies 50, thereby preventing the plating solution from leaking. In addition, spacers 15 are provided between the wound fiber bodies 50 and between the wound fiber body 50 at the lower side and the bottom of the plating bath 10, thereby preventing the plating solution from leaking at the locations mentioned above.

The example of the apparatus shown in the figures has a structure in which the fixing shaft 11 is vertically provided in the plating bath 10; however, the fixing shaft 11 may be detachably mounted on the side wall of the plating bath 10 in the horizontal direction. When the fixing shaft 11 is detachably mounted to the plating bath 10 in the vertical direction as shown in the figures, the fixing shaft 11 is easily removed from the plating bath 10, and when the fixing shaft 11 is detachably mounted in the horizontal direction, it is preferably since pressures of the plating solution flowing in the fixing shaft 11 are uniform.

In the structure of the apparatus described above, the plating solution is supplied to the fixing shaft 11 via the solution supply tube 31 after leakage of the solution is prevented. The leakage of the solution mentioned above is prevented by the steps of mounting the wound fiber body 50 to the fixing shaft 11 in the plating bath 10 by inserting the fixing shaft 11 in the core 51, providing the spacers 15 between the wound fiber bodies 50 disposed in the vertical direction and between the wound fiber body 50 at the lower side and the bottom of the plating bath 10 and screwing the fixing plate 14 on the top of the fixing shaft 11, and fastening the fixing plate 14 so as not to form gaps between the wound fiber body 50 and the spacer 15 and between the wound fiber body 50 and the fixing plate 14. The plating solution flows from the fixing shaft 11 toward the wound fiber body 50 via the passing holes 12, infiltrates into the wound fiber body 50 through the core 51 which passes a solution, and flows in the plating bath 10 via the inside of the wound fiber body 50, thereby forming a flow path of the plating solution. Electroless plating is performed while the plating solution flows. The plating solution is circulated so that the amount of the plating solution flowing out of the plating bath 10 and that of the plating solution fed thereto are equivalent to each other.

In particular, for example, the wound fiber body 50 in a cheese winding form composed of a continuous polyester fiber or the like is mounted in the plating bath 10, is washed with water after the surface of the fiber is degreased by circulating a degreasing solution, is further processed by etching treatment by circulating an alkaline solution, and is then washed with water. Next, after neutralization is performed by circulating a concentrated hydrochloride solution or a sulfuric acid solution, activation treatment is performed by using one of a tin-based or a palladium-based solution or a mixture thereof. Subsequently, electroless plating is performed by circulating a plating solution composed of silver or the like, and after plating, washing using water is performed. In these steps, instead of alkaline treatment, treatment may be performed using a solution containing stannous chloride.

According to the manufacturing apparatus and the manufacturing method described above, since the plating solution is fed to the inside of the wound fiber body via the fixing shaft and flows toward the outside of the wound fiber body, the gaps formed in the wound fiber body are expanded toward outside, and the plating solution infiltrates into small portions in the wound fiber body, whereby silver plating or platinum plating can be performed uniformly on the surface of the fiber even though in a cheese winding state. Consequently, a white conductive fiber can be manufactured at an inexpensive cost, which has a degree of whiteness (L value) of 50 or more, and preferably, of 55 or more, and has a volume resistivity of 100 Ω·cm or less, and preferably, of 0.1 Ω·cm or less.

In addition, in the plating method described above, uniformity of metal plating can be further improved by temporarily stopping the supply of the plating solution to the fixing shaft so as to infiltrate the plating solution received in the plating bath into the wound fiber body, or when necessary, by discharging the plating solution to the outside of the apparatus via the fixing shaft so as to temporarily form a flow path from the plating bath to the fixing shaft via the inside of the wound fiber body, which is opposite to the flow path described above.

The metal-coated fiber having the orange peel surface according to the present invention can be obtained by performing electrolytic plating or chemical plating on the surface of the fiber, such as organic fibers described above, so that the metal coating described above has an orange peel surface. In this step, when the metal coating is formed, it is more preferably that the surface of the fiber be etched by using an alkaline solution beforehand so as to roughen the surface thereof since an anchor effect can be obtained by the plating metal infiltrated in the roughened surface.

EXAMPLES

Hereinafter, the present invention will be described in detail with reference to examples. However, the present invention is not limited thereto.

Example 1

A wound fiber body formed in a cheese winding form composed of 500 g of a polyester multifilament fiber (75 d/36 f) by soft-winding at a winding density of 0.130 g/cm$^3$ was mounted to a fixing shaft in a plating apparatus, and by using the plating apparatus shown in FIG. 1, (A) degreasing, (B) alkaline treatment and neutralization treatment, (C) activation treatment, and (D) electroless plating were sequentially performed. The treatment mentioned above was performed by circulating a chemical solution under pressure using a pump or the like at a pumping pressure of 10 kg/cm$^2$ and at a flow rate of solution of 10 1/min.

(A) Degreasing

A degreasing solution (Ace Clean A-220, manufactured by Okuno Chemical Industries Co., Ltd.) at a concentration of 5 wt % was circulated in the plating bath at 55° C. for 5 minutes, and subsequently, sufficient washing was performed by circulating ion exchanged water.

(B) Alkaline treatment

Next, a sodium hydroxide solution at a concentration of 20 wt % was circulated in the plating bath at 70° C. for 20 minutes, sufficient washing was then performed by circulating ion exchanged water, and a hydrochloride solution at a concentration of 5 wt % was subsequently circulated in the plating bath at room temperature for 2 minutes.

(C) Activation treatment

Next, a mixed solution of a concentrated hydrochloride solution and palladium chloride (Catalyst C, manufactured by Okuno Chemical Industries Co., Ltd.) was circulated in the plating bath at room temperature for 3 minutes, and sufficient washing was then performed by circulating ion exchanged water. Subsequently, a sulfuric acid solution at a concentration of 10 wt % was circulated in the plating bath at 45° C. for 3 minutes.

(D) Plating

After the catalyst was adhered to the surface of the fiber by the treatment described above, silver plating was performed by circulating a silver plating solution at 25° C. in the plating bath. The plating solution is composed of sodium ethylenediaminetetraacetate (200 g/2 L) sodium hydroxide (50 g/2 L), formalin (100 ml/2 L), silver nitrate (36.1 g), and aqueous ammonia (100 ml). In the plating, since all silver ions contained in the plating solution were reduced and precipitated, a plating solution was used containing silver ions in an amount corresponding to that to be plated. After 125 g of silver was plated which was 20 wt % of the total fiber, sufficient washing with water was performed, and then hot air drying was performed at 80° C. for 17 hours or more.

The resistance between terminals, volume resistivity, and the degree of whiteness of the white conductive fiber obtained by the steps described above are shown in Table 1. In addition, evaluation results of durability tests against washing are shown in Table 2. The durability test against washing was performed by the steps described below using a household washing machine. The durability test comprises the steps of putting several meters of a conductive fiber in a cleaning net, which is taken from the wound fiber body, adding a typical household detergent together with water in a manner similar to that for the washing of clothing, and performing one wash cycle of cleaning, rinsing, and spin-drying. For the evaluation, the surface of the fiber was observed by using a scanning electron microscope in each cycle, and the resistance (Ω/cm) between the terminals was measured at the first fifth cycle and at every ten cycles thereafter. In addition, the volume resistivity (Ω·cm) was measured in accordance with the shape of the sample. In this measurement, the volume resistivity was obtained from the resistance between terminals assuming that one denier of the polyester fiber 450 m long was 0.05 g.

Examples 2 to 5

White conductive fibers were manufactured by plating silver on the surfaces of fibers in a manner equivalent to that in Example 1 except that the winding density was 0.182 g/cm in Example 2, a polyester fiber having a width of 40 deniers (40 d/18 f) was used in Example 3, 5 wt % silver of the fiber is plated in Example 4, and 50 wt % silver of the fiber was plated in Example 5. The results are shown in Table 1. In addition, the results of the durability test against washing are shown in Table 2.

Example 6

A white conductive fiber was manufactured by electroless plating in a manner equivalent to that in Example 1 except that a wound fiber body formed in a cheese winding form by soft winding an acrylic multifilament fiber (75 d/36 f) at a winding density of 0.130 g/cm was used, and as pretreatment, after a degreasing solution (Ace Clean A-220, manufactured by Okuno Chemical Industries Co., Ltd.) at a concentration of 5 wt % was circulated in the plating bath at 55° C. for 5 minutes, washing was sufficiently performed by circulating ion exchanged water, a mixed solution of a stannous chloride solution at a concentration of 1 wt % and a hydrochloride solution at a concentration of 2 wt % was then circulated in the plating bath at room temperature for 10 minutes, and subsequently, washing was sufficiently performed by circulating ion exchanged water. The volume resistivity, the degree of whiteness, and the like of the white conductive fiber are shown in Table 1.

As shown in Table 1, all of the white conductive fibers according to the present invention had beautiful opaque white having degrees of whiteness (L value) of 50 or more, and most of the fibers had degrees of whiteness of 55 or more. In addition, all of the white conductive fibers described above exhibited high conductivity having volume resistivities of 100 Ω·cm or less, and most of the fibers had volume resistivities of 0.1 Ω·cm or less. Furthermore, in the white conductive fiber according to the present invention, since the plated coating film had superior adhesion, even though processed by general washing, the coating film was not separated, as shown in Table 2, whereby the durability thereof was superior. In addition, even when washing was repeatedly performed, increases in volume resistivities of the fibers of the present invention were small, and hence, durability against washing thereof was also superior.

Comparative Example 1

After a polyester multifilament fiber (75 d/36 d) in an amount of 500 g, similar to that used in Example 1, was formed into a wound fiver body in a cheese winding form by soft-winding at a winding density of 0.130 g/cm and was then pretreated, silver plating was performed by immersing the wound fiber body into a silver plating solution. The pretreatment mentioned above was performed as described below. As a pretreatment solution, a mixture was prepared composed of a dyeing solution for surface treatment (Kayanol Milling Green, manufactured by Nippon Kayaku Co., Ltd.) for controlling surface polarity of a thread at a concentration of 0.6 wt %, an ammonium acetate solution at a concentration of 5 wt %, and an acetic acid solution at a concentration of 1 wt %, and the wound fiber body was immersed in the mixture described above at 98 to 100° C. for 45 minutes and was then sufficiently washed using ion exchanged water. Next, the wound fiber body was immersed at 80 to 90° C. for 30 minutes in a solution of a fixing agent primarily composed polyhydroxybenzenesulfonic acid at a concentration of 5 wt % and was then sufficiently washed with ion exchanged water. Subsequently, the wound fiber body was immersed in a polyethylene imine solution at a concentration of 5 wt % at 95 to 98° C. for 30 minutes so as to stabilize the surface polarity and was then sufficiently washed with ion exchanged water.

After the surface treatment described above was completed, silver plating was performed in a manner equivalent to that in Example 1 except that the wound body was immersed in a silver plating solution, which was equivalent to that used in Example 1, received beforehand in the plating bath, in which a solution flowing inside the wound fiber body was not controlled as was the case in the present invention. In the conductive fiber obtained by the method described above, as shown in Table 1, the degree of whiteness was significantly decreased due to the pretreatment, so that the degree of whiteness (L value) was 40. In addition, silver plating was unevenly performed, variation in resistivity was large, and most parts of the wound fiber body had considerably higher volume resistivity than those of the wound fiber bodies according to the present invention. Furthermore, the strength of coating film formed by silver plating was small, and hence, the durability thereof was also inferior.

Comparative Example 2

Silver plating was performed in a manner equivalent to that in Example 1 except that the pretreatments other than that using a dyeing solution for surface treatment in Comparative Example 1 were performed for a wound fiber body, and the wound fiber body was then immersed in a silver plating solution, equivalent to that used in Example 1, received beforehand in the plating bath, in which a solution flowing inside the wound fiber body was not controlled as was the case in the present invention. The degree of whiteness (L value) of the conductive fiber thus obtained was slightly higher than that obtained in Comparative Example 1 since the pretreatment using the dyeing solution for surface treatment was not performed; however, the degree of whiteness did not reach 50. In addition, since silver plating was unevenly performed than that in Comparative Example 1, the variations in degree of whiteness and volume resistivity were large, the volume resistivity was considerably high, such as $10^5$ Ω·cm or more, and hence, the conductivity was significantly lower than those obtained in the examples of the present invention. Furthermore, the durability of plated silver was also inferior.

TABLE 1

| | Fiber (Continuous Fiber) | | | Plated Film | | Resistance Between | Volume | Degree of | |
|---|---|---|---|---|---|---|---|---|---|
| | Type | Width | Winding Density | Component | Plating Amount | Terminals (Ω/cm) | Resistivity (Ω · cm) | Whiteness (L Value) | Evaluation |
| Example 1 | Polyester | 75d/36f | 0.130 | Ag | 20% | 5.80 | 0.026 | 62 | ○ |
| Example 2 | Fiber | 75d/36f | 0.182 | Ag | 20% | 270 | 1.2 | 55 | ○ |
| Example 3 | | 40d/18f | 0.130 | Ag | 20% | 6.46 | 0.015 | 58 | ○ |
| Example 4 | | 75d/36f | 0.130 | Ag | 5% | 4,300 | 19 | 52 | ○ |
| Example 5 | | 75d/36f | 0.130 | Ag | 50% | 0.75 | 0.0033 | 65 | ○ |
| Example 6 | Acrylic Fiber | 75d/36f | 0.130 | Ag | 20% | 2.4 | 0.011 | 53 | ○ |
| Comparative Example 1 | Polyester Fiber | 75d/36f | 0.13 | Ag | 20% | 1.0–$5.0 \times 10^6$ | 1.0–$5.0 \times 10^4$ | 40 | x |
| Comparative Example 2 | | 75d/36f | 0.13 | Ag | 20% | Not less than $10^7$ | Not less than $10^5$ | 47 | x |

Note:
An amount of a fiber material for each example is 500 g.
Unit of winding density is g/cm³, plating amount is wt % of the fiber, and Evaluation is in accordance with durability test against washing.

TABLE 2

(Unit of Resistance between Terminals: Ω/cm)

| | Example 1 | | Example 2 | | Example 3 | | Example 4 | | Example 5 | | Example 6 | |
|---|---|---|---|---|---|---|---|---|---|---|---|---|
| # | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) |
| 0 | $5.80 \times 10^0$ | $2.61 \times 10^{-2}$ | $2.70 \times 10^2$ | $1.22 \times 10^0$ | $6.46 \times 10^0$ | $1.55 \times 10^{-2}$ | $4.30 \times 10^2$ | $1.94 \times 10^0$ | $7.50 \times 10^{-1}$ | $3.38 \times 10^{-3}$ | $2.40 \times 10^0$ | $1.08 \times 10^{-2}$ |

TABLE 2-continued (Unit of Resistance between Terminals: Ω/cm)

| # | Example 1 | | Example 2 | | Example 3 | | Example 4 | | Example 5 | | Example 6 | |
|---|---|---|---|---|---|---|---|---|---|---|---|---|
| | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) | Resistance between Terminals | Volume Resistivity (Ω · cm) |
| 5 | $5.83 \times 10^{0}$ | $2.62 \times 10^{-2}$ | $2.50 \times 10^{2}$ | $1.13 \times 10^{0}$ | $7.80 \times 10^{0}$ | $1.87 \times 10^{-2}$ | $3.90 \times 10^{2}$ | $1.76 \times 10^{0}$ | $9.30 \times 10^{-1}$ | $4.19 \times 10^{-3}$ | $3.10 \times 10^{0}$ | $1.40 \times 10^{-2}$ |
| 10 | $6.21 \times 10^{0}$ | $2.79 \times 10^{-2}$ | $3.10 \times 10^{2}$ | $1.40 \times 10^{0}$ | $8.51 \times 10^{0}$ | $2.04 \times 10^{-2}$ | $5.50 \times 10^{2}$ | $2.48 \times 10^{0}$ | $8.10 \times 10^{-1}$ | $3.65 \times 10^{-3}$ | $4.40 \times 10^{0}$ | $1.98 \times 10^{-2}$ |
| 20 | $6.03 \times 10^{0}$ | $2.71 \times 10^{-2}$ | $2.90 \times 10^{2}$ | $1.31 \times 10^{0}$ | $9.93 \times 10^{0}$ | $2.38 \times 10^{-2}$ | $6.10 \times 10^{2}$ | $2.75 \times 10^{0}$ | $7.90 \times 10^{-1}$ | $3.56 \times 10^{-3}$ | $2.80 \times 10^{0}$ | $1.26 \times 10^{-2}$ |
| 30 | $6.17 \times 10^{0}$ | $2.78 \times 10^{-2}$ | $3.50 \times 10^{2}$ | $1.58 \times 10^{0}$ | $8.86 \times 10^{0}$ | $2.13 \times 10^{-2}$ | $4.90 \times 10^{2}$ | $2.21 \times 10^{0}$ | $1.02 \times 10^{-1}$ | $4.59 \times 10^{-3}$ | $3.70 \times 10^{0}$ | $1.67 \times 10^{-2}$ |
| 40 | $5.99 \times 10^{0}$ | $2.70 \times 10^{-2}$ | $4.70 \times 10^{2}$ | $2.12 \times 10^{0}$ | $1.01 \times 10^{0}$ | $2.42 \times 10^{-2}$ | $6.30 \times 10^{2}$ | $2.84 \times 10^{0}$ | $9.80 \times 10^{-1}$ | $4.41 \times 10^{-3}$ | $4.50 \times 10^{0}$ | $2.03 \times 10^{-2}$ |
| 50 | $5.87 \times 10^{0}$ | $2.64 \times 10^{-2}$ | $4.10 \times 10^{2}$ | $1.85 \times 10^{0}$ | $7.39 \times 10^{0}$ | $1.77 \times 10^{-2}$ | $5.50 \times 10^{2}$ | $2.48 \times 10^{0}$ | $1.10 \times 10^{-1}$ | $4.95 \times 10^{-3}$ | $5.10 \times 10^{0}$ | $2.30 \times 10^{-2}$ |
| 60 | $6.04 \times 10^{0}$ | $2.72 \times 10^{-2}$ | $3.60 \times 10^{2}$ | $1.62 \times 10^{0}$ | $8.19 \times 10^{0}$ | $1.97 \times 10^{-2}$ | $4.70 \times 10^{2}$ | $2.12 \times 10^{0}$ | $8.70 \times 10^{-1}$ | $3.92 \times 10^{-3}$ | $4.20 \times 10^{0}$ | $1.89 \times 10^{-2}$ |
| 70 | $7.31 \times 10^{0}$ | $3.29 \times 10^{-2}$ | $5.90 \times 10^{2}$ | $2.66 \times 10^{0}$ | $6.99 \times 10^{0}$ | $1.68 \times 10^{-2}$ | $6.00 \times 10^{2}$ | $2.70 \times 10^{0}$ | $1.05 \times 10^{-1}$ | $4.73 \times 10^{-3}$ | $4.80 \times 10^{0}$ | $2.16 \times 10^{-2}$ |
| 80 | $6.85 \times 10^{0}$ | $3.08 \times 10^{-2}$ | $4.50 \times 10^{2}$ | $2.03 \times 10^{0}$ | $9.07 \times 10^{0}$ | $2.18 \times 10^{-2}$ | $7.10 \times 10^{2}$ | $3.20 \times 10^{0}$ | $9.90 \times 10^{-1}$ | $4.46 \times 10^{-3}$ | $5.30 \times 10^{0}$ | $2.39 \times 10^{-2}$ |
| 90 | $6.39 \times 10^{0}$ | $2.88 \times 10^{-2}$ | $4.20 \times 10^{2}$ | $1.89 \times 10^{0}$ | $8.99 \times 10^{0}$ | $2.16 \times 10^{-2}$ | $6.60 \times 10^{2}$ | $2.97 \times 10^{0}$ | $8.90 \times 10^{-1}$ | $4.01 \times 10^{-3}$ | $5.00 \times 10^{0}$ | $2.25 \times 10^{-2}$ |
| 100 | $7.06 \times 10^{0}$ | $3.18 \times 10^{-2}$ | $4.90 \times 10^{2}$ | $2.21 \times 10^{0}$ | $9.96 \times 10^{0}$ | $2.39 \times 10^{-2}$ | $8.20 \times 10^{2}$ | $3.69 \times 10^{0}$ | $1.02 \times 10^{-1}$ | $4.59 \times 10^{-2}$ | $4.90 \times 10^{0}$ | $2.21 \times 10^{-2}$ |

Example 7

A wound fiber body in a cheese winding form was formed by winding a polymer material shown in Table 3 around a core and was mounted to a fixing shaft in a plating bath. Next, (A) degreasing, (B) alkaline treatment and neutralization treatment, (C) activation treatment, and (D) electroless plating using a metal sown in Table 3 were sequentially performed. In addition, (E) surface treatment, i.e., anticorrosion treatment, was performed. The treatment mentioned above was performed by circulating chemical solutions under pressure.

(A) Degreasing

A degreasing solution (Ace Clean A-220, manufactured by Okuno Chemical Industries Co., Ltd.) at a concentration of 5 wt % was circulated in the plating bath at 55° C. for 5 minutes, and subsequently, sufficient washing was performed by circulating ion exchanged water.

(B) Alkaline treatment

Next, after the degreasing treatment described above, a sodium hydroxide solution at a concentration of 20 wt % was circulated in the plating bath at 70° C. for 20 minutes, sufficient washing was then performed by circulating ion exchanged water, and a hydrochloride solution at a concentration of 5 wt % was subsequently circulated in the plating bath at room temperature for 2 minutes.

(C) Activation treatment

After the alkaline treatment described above, a mixture of a concentrated hydrochloride solution and palladium chloride (Catalyst C, manufactured by Okuno Chemical Industries Co., Ltd.) was circulated in the plating bath at room temperature for 3 minutes, and sufficient washing was then performed by circulating ion exchanged water. Subsequently, a sulfuric acid solution at a concentration of 10 wt % was circulated in the plating bath at 45° C. for 3 minutes.

(D) Plating

After the catalyst was adhered to the surface of the fiber by the treatment described above, plating was respectively performed by circulating plating solutions composed of platinum, silver, and nickel shown in Table 3 so as to form metal coatings having orange peel surfaces. In addition, as comparative examples, metal coatings having no orange peel surfaces were formed by plating using the respective metals mentioned above under conditions approximately equivalent to those for the plating described above.

(E) Surface Treatment (Anticorrosion treatment)

An anticorrosion agent (Cheleslite ACW-1, manufactured by Chelest Chemical Inc.) diluted by 3 times the volume of water was added to the plating bath, and the surface treatment of the fibers provided with metal coatings obtained by the treatment described above was performed by immersing in the solution of the anticorrosion solution.

Figure 4:
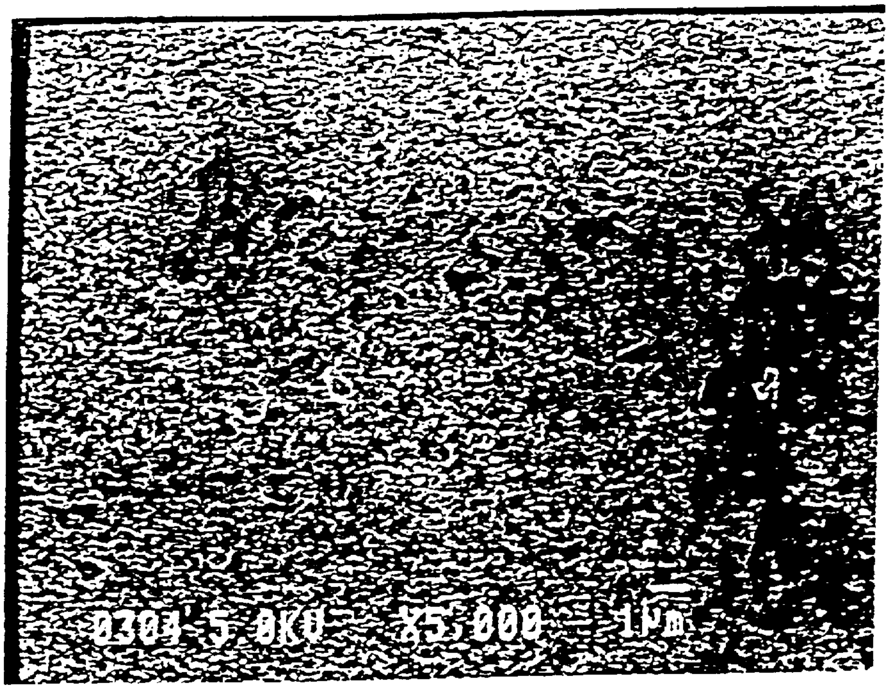
FIG. 4 is a microscopic photograph showing an orange peel texture of a metal coating according to the present invention.

The adhesion strength (separation strength), the conductivity, and the degree of whiteness were measured for the metal-coated fibers thus formed. The results are shown in Table 3. In addition, the results of a commercially available conductive fiber are also shown as a comparative example in the table. FIG. 4 is a microscopic photograph showing a texture of the metal coating having an orange peel surface of the sample No. A1 according to the present invention.

The adhesion strength was measured by a separation strength test in accordance with the standard test (JIS L 0849) determining color fastness of fibers and cloths. In particular, the separation strength test was carried out in a manner in which a white cloth was overlaid over a test sample, i.e., a bundle of a metal-coated fiber, with a load of 200 g and was rubbed back and forth 100 times at a reciprocating speed of 30 times per minute. The separation strength (adhesion strength) was determined by a degree of staining adhered to the white cloth in accordance with the standards from grade 1 to grade 5 defined in decreasing order of staining (in the increasing order of adhesion). Concerning the conductivity, the resistance between terminals (Ω) was measured using a digital multi-meter by connecting electrodes at both ends of a metal-coated fiber approximately 10 cm long, and the resistivity (volume resistivity) (Ω·cm) was calculated from the resistance between terminals using the length (cm) and cross-sectional area ($cm^2$) of a fiber. As the degree of whiteness, the L value was measured by the Lab method in accordance with Hunter's formula. The higher the L value, the higher the degree of whiteness.

As shown in a microscopic photograph in FIG. 4, the surface of the metal coating according to the present invention is an orange peel surface formed of metal grains having diameters of approximately 0.05 to 1 μm. As shown in Table 3, since the separation strengths of the metal coatings having orange peel surfaces were grade 3 or more, and most of them were grade 4 or 5, the metal coatings of the present invention had significantly superior adhesion compared to those of conventional ones. In addition, the conductive fibers had superior conductivities having resistivities (volume resistivities) of $5\times10^{-5}$ to $10^{-3}$ Ω·cm. Furthermore, the conductive fiber of the present invention had superior whiteness having a degree of whiteness of 60 or more, and some of the conductive fibers had 65 to 70. In contrast, the commercially available conductive fiber and the fibers of the comparative examples (B1 to B3) having smooth surfaces all had poor separation strengths of grade 1 to grade 2, i.e., inferior adhesion, and the degree of whiteness thereof were also low.

TABLE 3

(Unit of Volume Resistivity: Ω · cm)

| No | Fiber | Metal | Surface State | Peel Strength | Volume Resistivity | Whiteness (L value) |
|---|---|---|---|---|---|---|
| A1 | PET | Ni | Orange | Grade 5 | $5 \times 10^{-5}$ | 60 |
| | Fiber | Ag | Peel | Grade 5 | $5 \times 10^{-5}$ | 70 |
| | | Au | | Grade 4 | $5 \times 10^{-5}$ | — |
| A2 | Polyamide | Ni | Orange | Grade 4 | 0.001 | 60 |
| | Fiber | Ag | Peel | Grade 4 | 0.001 | 65 |
| | | Au | | Grade 4 | 0.001 | — |
| A3 | Acrylic | Ni | Orange | Grade 5 | $5 \times 10^{-5}$ | 65 |
| | Fiber | Ag | Peel | Grade 5 | $5 \times 10^{-5}$ | 70 |
| | | Au | | Grade 4 | $5 \times 10^{-5}$ | — |
| B1 | PET | Ni | Smooth | Grade 2 | 0.001 | 60 |
| | Fiber | Ag | | Grade 1 | 0.001 | 65 |
| | | Au | | Grade 1 | 0.001 | — |
| B2 | Polyamide | Ni | Smooth | Grade 2 | $5 \times 10^{-5}$ | 55 |
| | Fiber | Ag | | Grade 2 | 0.001 | 60 |
| | | Au | | Grade 2 | 0.001 | — |
| B3 | Acrylic | Ni | Smooth | Grade 2 | $5 \times 10^{-5}$ | 60 |
| | Fiber | Ag | | Grade 1 | 0.001 | 65 |
| | | Au | | Grade 1 | 0.001 | — |
| CA | | Ag | Smooth | Grade 2 | 100 | 65 |

Note: CA is commercially available fiber, A1 to A3 are Examples, and B1 to B3 and CA are Comparative Example.

What is claimed is:

1. A conductive fiber comprising a fiber material provided with a metal coating thereon, wherein the degree of whiteness represented by the L value in accordance with the Lab method is 50 or more, and the volume resistivity is 100 Ω·cm or less, wherein the surface of the metal coating is an orange peel surface.

2. A conductive fiber according to claim 1, wherein the fiber material is one selected from the group consisting of a polyester fiber, a polyamide fiber, and an acrylic fiber.

3. A conductive fiber according to claim 1, wherein the metal coating comprises one selected from the group consisting of silver, gold, platinum, copper, nickel, tin, zinc, palladium, and alloys thereof.

4. A conductive fiber according to claim 1, wherein the degree of whiteness represented by the L value is 55 or more, the volume resistivity is 0.1 Ω·cm or less, and the metal coating has an orange peel surface having a surface roughness of 0.01 to 1 μm.

5. A conductive fiber according to claim 1, wherein the metal coating has a standard strength of grade 3 or more in a separation strength test.

6. A conductive fiber according to claim 1, wherein the metal coating comprises silver having silver ions with antifungal properties.

7. A conductive fiber according to claim 1, wherein the metal coating provided on the fiber material is processed by surface treatment.

8. A conductive fiber according to claim 7, wherein the surface treatment is at least one of anticorrosion treatment and oiling treatment.

9. A conductive fiber according to claim 1, which is obtained by a method including the following steps: a step of washing treatment, a step of alkaline treatment, a step of neutralization treatment, a step of activation treatment, and a step of performing electroless plating.

10. A conductive fiber according to claim 1, which is a continuous fiber.

11. A conductive fiber according to claim 1, wherein the metal coating having an orange peel surface has a surface roughness of 0.01 to 1 μm.

12. A conductive fiber according to claim 7, wherein the surface treatment is at least one of anticorrosion treatment and oiling treatment, and the metal coating has an orange peel surface having a surface roughness of 0.01 to 1 μm.

13. A conductive fiber comprising a fiber material provided with a metal coating thereon, wherein the degree of whiteness represented by the L value in accordance with the Lab method is 50 or more, and the volume resistivity is less than 100 Ω·cm.

14. A conductive fiber comprising a fiber material provided with a metal coating thereon, wherein the degree of whiteness represented by the L value in accordance with the Lab method is 50 or more, and the volume resistivity is 100 Ω·cm or less.

15. A material selected from the group consisting of a woven fabric, a non-woven fabric, a knitted fabric, a clothing material having antifungal properties, an electromagnetic shielding material, an antistatic material, an alternative material for at least one of an electrode and an electric cable, and a conductive reinforcing material for a fiber-reinforced plastic, comprising a conductive fiber according to claim 1.

16. A method for manufacturing a conductive fiber according to claim 1, comprising:

a step of providing a tubular fixing shaft having a plurality of holes for passing a solution in a plating bath;

a step of mounting a wound fiber body formed by winding a fiber material to the fixing shaft;

a step of forming a flow path of a plating solution from the fixing shaft to the plating bath via the wound fiber body so as to infiltrate the plating solution into the wound fiber body; and a step of performing electroless plating on the fiber material while the plating solution flows.

17. A method for manufacturing a conductive fiber according to claim 16, further comprising a step of temporarily forming a flow path of the plating solution from the plating bath to the fixing shaft via the wound fiber material so as to infiltrate the plating solution into the wound fiber body.

18. A method for manufacturing a conductive fiber according to one of claims 16 and 17, further comprising, after the step of mounting the wound fiber body, a step of washing treatment, a step of alkaline treatment, a step of neutralization treatment, and a step of activation treatment, wherein the subsequent step of performing electroless plating is one of a step of performing silver electroless plating and a step of platinum electroless plating, whereby a white conductive fiber is manufactured having a degree of whiteness (L value) of 50 or more and a volume resistivity of 100 Ω·cm or less, in which a metal coating surface is an orange peel surface.

* * * * *